(12) United States Patent
Sumiya et al.

(10) Patent No.: US 10,442,007 B2
(45) Date of Patent: Oct. 15, 2019

(54) COMPOSITE POLYCRYSTAL

(71) Applicant: Sumitomo Electric Industries, Ltd., Osaka-shi (JP)

(72) Inventors: Hitoshi Sumiya, Itami (JP); Takeshi Sato, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/534,314

(22) PCT Filed: Oct. 7, 2016

(86) PCT No.: PCT/JP2016/079939
§ 371 (c)(1),
(2) Date: Jun. 8, 2017

(87) PCT Pub. No.: WO2017/073297
PCT Pub. Date: May 4, 2017

(65) Prior Publication Data
US 2018/0001391 A1    Jan. 4, 2018

(30) Foreign Application Priority Data

Oct. 30, 2015 (JP) ................................. 2015-214038

(51) Int. Cl.
| | |
|---|---|
| *B01J 3/06* | (2006.01) |
| *E21B 10/567* | (2006.01) |
| *B23B 27/20* | (2006.01) |
| *C04B 35/52* | (2006.01) |
| *C04B 35/528* | (2006.01) |
| *C04B 35/645* | (2006.01) |

(52) U.S. Cl.
CPC ............... *B23B 27/20* (2013.01); *B01J 3/062* (2013.01); *C04B 35/52* (2013.01); *C04B 35/528* (2013.01); *C04B 35/645* (2013.01); *B01J 2203/062* (2013.01); *B01J 2203/0655* (2013.01); *B01J 2203/0685* (2013.01); *C04B 2235/425* (2013.01); *C04B 2235/427* (2013.01); *C04B 2235/5436* (2013.01); *C04B 2235/5445* (2013.01); *C04B 2235/608* (2013.01); *C04B 2235/72* (2013.01); *C04B 2235/785* (2013.01); *C04B 2235/80* (2013.01)

(58) Field of Classification Search
CPC .......... B01J 2203/062; B01J 2203/0655; B01J 2203/0685; B23B 27/20; E21B 10/567; E21B 10/40
See application file for complete search history.

(56) References Cited

U.S. PATENT DOCUMENTS

| | | | | |
|---|---|---|---|---|
| 3,949,062 | A | * | 4/1976 | Vereschagin ............ B01J 3/062 423/446 |
| 5,690,794 | A | * | 11/1997 | Molchanov .............. B01J 3/062 204/157.15 |
| 2010/0146865 | A1 | | 6/2010 | Sato et al. |
| 2015/0274533 | A1 | * | 10/2015 | Arimoto ................. C04B 35/52 428/408 |

FOREIGN PATENT DOCUMENTS

| | | |
|---|---|---|
| JP | H04-083525 A | 3/1992 |
| JP | H09-142933 A | 6/1997 |
| JP | 2003-292397 A | 10/2003 |
| JP | 2005-239472 A | 9/2005 |
| JP | 2014-009144 A | 1/2014 |
| WO | 2009/099130 A1 | 8/2009 |
| WO | WO 2015/025757 * | 2/2015 ............. C01B 31/06 |

OTHER PUBLICATIONS

The journal article of "Indentation hardness of nano-polycrystalline diamond prepared from graphite by direct conversion" by Sumiya et al. available online Apr. 27, 2004.*

* cited by examiner

*Primary Examiner* — Pegah Parvini
(74) *Attorney, Agent, or Firm* — Baker Botts L.L.P.; Michael A. Sartori

(57) ABSTRACT

A composite polycrystal contains polycrystalline diamond formed of diamond grains that are directly bonded mutually, and compressed graphite dispersed in the polycrystalline diamond.

6 Claims, 1 Drawing Sheet

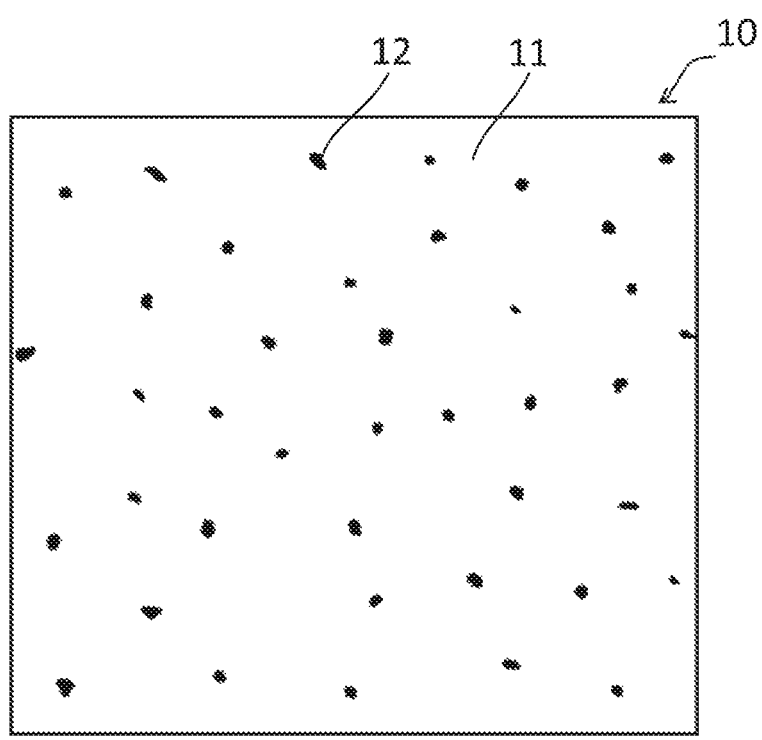

COMPOSITE POLYCRYSTAL

TECHNICAL FIELD

The present invention relates to a composite polycrystal. The present application claims the priority based on Japanese Patent Application No. 2015-214038 filed on Oct. 30, 2015, the entire contents of which are incorporated by reference herein.

BACKGROUND ART

Since diamond is a substance having the highest hardness of the substances existing on the earth, a sintered material or a polycrystal containing diamond is used as a material for an abrasion resistant tool, a cutting tool or the like.

Japanese Patent Laying-Open No. 2003-292397 (PTD 1) discloses a diamond polycrystal composed of diamond that is obtained by conversion and sintering from a carbon substance having a graphite-type layered structure under ultra-high pressure and high temperature without addition of a sintering aid or a catalyst, and that has a mean grain size of diamond of less than or equal to 100 nm, and a purity of greater than or equal to 99%. Also disclosed is a method for producing a diamond polycrystal by direct conversion without addition of a sintering aid or a catalyst by putting a non-diamond carbon substance into a pressure cell equipped with a means for indirect heating, and conducting heating and pressurization.

International Publication No. 2009/099130 (PTD 2) discloses a diamond polycrystal produced by converting and sintering non-diamond carbon under ultrahigh pressure and high temperature without addition of a sintering aid or a catalyst, wherein the sintered diamond grains forming the diamond polycrystal have a mean grain size of larger than 50 nm and less than 2500 nm, and the diamond polycrystal has a purity of greater than or equal to 99% and a D90 grain size of the diamond of less than or equal to (mean grain size+ mean grain size×0.9).

Japanese Patent Laying-Open No. 9-142933 (PTD 3) discloses a diamond polycrystal containing 0.1 to 30% by volume of a substance composed of an oxide and/or a carbonate and/or a carbide of a rare-earth element, and the rest of diamond.

Japanese Patent Laying-Open No. 2005-239472 (PTD 4) discloses a diamond sintered material having high strength and high abrasion resistance, containing sintered diamond grains having a mean grain size of less than or equal to 2 μm, and the rest of a binder phase, wherein the content of the sintered diamond grains in the diamond sintered material is greater than or equal to 80% by volume and less than or equal to 98% by volume; the binder phase contains at least one element selected from the group consisting of titanium, zirconium, hafnium, vanadium, niobium, tantalum, chromium, and molybdenum in a content in the binder phase of greater than or equal to 0.5% by mass and less than 50% by mass, and cobalt in a content in the binder phase of greater than or equal to 50% by mass and less than 99.5% by mass; part or all of the at least one element selected from the group consisting of titanium, zirconium, hafnium, vanadium, niobium, tantalum, chromium, and molybdenum exists as carbide grains having a mean grain size of less than or equal to 0.8 μm; the structure of the carbide grains is discontinuous; and the neighboring sintered diamond grains are bonded to each other.

CITATION LIST

Patent Documents

PTD 1: Japanese Patent Laying-Open No. 2003-292397
PTD 2: International Publication No. 2009/099130
PTD 3: Japanese Patent Laying-Open No. 9-142933
PTD 4: Japanese Patent Laying-Open No. 2005-239472

SUMMARY OF INVENTION

A composite polycrystal of the present disclosure contains polycrystalline diamond formed of diamond grains that are directly bonded mutually, and compressed graphite dispersed in the polycrystalline diamond.

BRIEF DESCRIPTION OF DRAWING

FIG. 1 is a schematic sectional view of a composite polycrystal according to one aspect of the present invention.

DESCRIPTION OF EMBODIMENTS

Technical Problems

The diamond polycrystal disclosed in Japanese Patent Laying-Open No. 2003-292397 (PTD 1) and International Publication No. 2009/099130 (PTD 2) has such a problem that when it is applied to a wiredrawing die which is an abrasion resistant tool, the pull-out resistance at the time of wiredrawing increases due to local abrasion, and the diameter of the wire after drawing decreases to result in increase in frequent breaking of the wire, and when it is applied to a scribe wheel or a drilling bit which is a cutting tool, the service life of the tool is shortened due to local abrasion or chipping by impact.

The diamond polycrystal or sintered material disclosed in Japanese Patent Laying-Open No. 9-142933 (PTD 3) and Japanese Patent Laying-Open No. 2005-239472 (PTD 4) has such a problem that when it is applied to a wiredrawing die which is an abrasion resistant tool, the coefficient of friction increases due to the contained metal oxide or metal, and the wiredrawing resistance increases and the diameter of the wire after drawing decreases to result in frequent breaking of the wire, and when it is applied to a scribe wheel or a drilling bit which is a cutting tool, the coefficient of friction increases due to the contained metal oxide or metal, and the cutting resistance increases and the service life of the tool is shortened due to the internal breakage caused by the thermal expansion of the contained metal.

As described above, the problem of shortening of the service life of the tool is associated with the abrasion of the diamond polycrystal or sintered material. In light of the above, it is an object of the present invention to provide a composite polycrystal containing polycrystalline diamond and non-diamond carbon, which has high abrasion resistance and is suitably used as a material for an abrasion resistant tool, a cutting tool or the like.

Advantageous Effects of Disclosure

According to the present disclosure, it is possible to provide a composite polycrystal containing polycrystalline diamond and non-diamond carbon, which has high abrasion resistance and is suitably used as a material for an abrasion resistant tool, a cutting tool or the like. Since the composite polycrystal has high abrasion resistance, it is possible to prevent the service life of the tool from being shortened by abrasion, and it is possible to prolong the service life of the tool.

DESCRIPTION OF EMBODIMENT

A composite polycrystal which is one embodiment of the present invention contains polycrystalline diamond formed of diamond grains that are directly bonded mutually, and compressed graphite dispersed in the polycrystalline diamond. Since the composite polycrystal of the present embodiment contains the compressed graphite dispersed in the polycrystalline diamond, it has high abrasion resistance.

In the composite polycrystal of the present embodiment, preferably, the polycrystalline diamond has a phase that is continuous three-dimensionally. Such a composite polycrystal has higher abrasion resistance.

In the composite polycrystal of the present embodiment, preferably, the diamond grains forming the polycrystalline diamond have a mean grain size of greater than or equal to 10 nm and less than or equal to 1000 nm. Such a composite polycrystal has higher abrasion resistance.

In the composite polycrystal of the present embodiment, preferably, the compressed graphite has a mean grain size of greater than or equal to 10 nm and less than or equal to 2000 nm. Such a composite polycrystal has higher abrasion resistance.

In the composite polycrystal of the present embodiment, preferably, the compressed graphite has a percentage in the composite polycrystal in whole of greater than or equal to 0.1% and less than or equal to 40% as calculated from $100 \times Ig\ (002)/\{Id\ (111)+Ig\ (002)\}$ wherein Ig (002) is an area of an X-ray diffraction peak derived from (002) surface of the compressed graphite, and Id (111) is an area of an X-ray diffraction peak derived from (111) surface of the polycrystalline diamond in an X-ray diffraction profile of the composite polycrystal. Such a composite polycrystal has higher abrasion resistance.

Preferably, the composite polycrystal of the present embodiment has a Knoop hardness of greater than or equal to 50 GPa. Such a composite polycrystal has higher abrasion resistance.

Preferably, the composite polycrystal of the present embodiment contains polycrystalline diamond formed of diamond grains that are directly bonded mutually, and compressed graphite dispersed in the polycrystalline diamond, wherein the polycrystalline diamond has a phase that is continuous three-dimensionally; the diamond grains forming the polycrystalline diamond have a mean grain size of greater than or equal to 10 nm and less than or equal to 1000 nm; the compressed graphite has a mean grain size of greater than or equal to 10 nm and less than or equal to 2000 nm; the compressed graphite has a percentage in the composite polycrystal in whole of greater than or equal to 0.1% and less than or equal to 40% as calculated from $100 \times Ig\ (002)/\{Id\ (111)+Ig\ (002)\}$ wherein Ig (002) is an area of an X-ray diffraction peak derived from (002) surface of the compressed graphite, and Id (111) is an area of an X-ray diffraction peak derived from (111) surface of the polycrystalline diamond in an X-ray diffraction profile of the composite polycrystal; and the composite polycrystal has a Knoop hardness of greater than or equal to 50 GPa. Such a composite polycrystal has higher abrasion resistance.

DETAILED DESCRIPTION OF EMBODIMENT

Referring to FIG. 1, a composite polycrystal 10 of the present embodiment contains polycrystalline diamond 11 formed of diamond grains that are directly bonded mutually, and compressed graphite 12 dispersed in the polycrystalline diamond. Composite polycrystal 10 of the present embodiment has high abrasion resistance because it contains compressed graphite 12 dispersed in polycrystalline diamond 11.

Polycrystalline diamond 11 and compressed graphite 12 contained in composite polycrystal 10 are observed with a SEM (scanning electron microscope) or TEM (transmission electron microscope). In SEM observation or TEM observation, polycrystalline diamond 11 is observed as a bright field, and compressed graphite 12 is observed as a dark field. Herein, compressed graphite 12 contained in composite polycrystal 10 refers to graphite having an interplanar spacing (referred to as d value) in the C axis (about 310 pm in d value) smaller than that of normal graphite (about 335 pm in d value), and is recognizable by an appearance position of an X-ray diffraction peak derived from (002) surface of graphite in an X-ray diffraction profile.

In polycrystalline diamond 11 of composite polycrystal 10, the phrase "diamond grains are directly bonded mutually" means that diamond grains are mutually bonded in such manner that they come into direct contact with each other, and for example, it means that diamond grains are mutually bonded without being interposed by other grains such as a binder. Mutual direct bonding of diamond grains is observed by SEM observation or TEM observation. The concentration of contained hydrogen of composite polycrystal 10 is measured by SIMS (secondary ion mass spectroscopy).

From the view point of higher abrasion resistance, in composite polycrystal 10 of the present embodiment, preferably, polycrystalline diamond 11 has a phase that is continuous three-dimensionally. The phrase "polycrystalline diamond 11 has a phase that is continuous three-dimensionally" means that the phase of polycrystalline diamond 11 is a continuous phase that exists continuously without any interruption in a three-dimensional space.

From the view point of higher abrasion resistance, in composite polycrystal 10 of the present embodiment, the mean grain size of the diamond grains forming polycrystalline diamond 11 is preferably greater than or equal to 10 nm and less than or equal to 1000 nm, more preferably greater than or equal to 100 nm and less than or equal to 800 nm.

From the view point of higher abrasion resistance, in composite polycrystal 10 of the present embodiment, the mean grain size of compressed graphite is preferably greater than or equal to 10 nm and less than or equal to 2000 nm, more preferably greater than or equal to 30 nm and less than or equal to 1500 nm.

The mean grain size of the diamond grains that form the polycrystalline diamond and the mean grain size of compressed graphite in composite polycrystal 10 each mean the diameter of an area equal to the average cross-sectional area of the respective grains.

From the view point of higher abrasion resistance of composite polycrystal 10, the percentage of compressed graphite 12 in composite polycrystal 10 in whole of the present embodiment is preferably greater than or equal to 0.1% and less than or equal to 40%, more preferably greater than or equal to 0.5% and less than or equal to 35% as calculated from $100 \times Ig\ (002)/\{Id\ (111)+Ig\ (002)\}$ wherein Ig (002) is an area of an X-ray diffraction peak derived from (002) surface of compressed graphite 12, and Id (111) is an area of an X-ray diffraction peak derived from (111) surface of polycrystalline diamond 11 in an X-ray diffraction profile of composite polycrystal 10.

The X-ray diffraction profile of composite polycrystal 10 is measured by a 2θ scanning method using Kα rays of Cu as a radiation source.

From the view point of higher abrasion resistance, composite polycrystal 10 of the present embodiment preferably has a Knoop hardness of greater than or equal to 50 GPa, more preferably greater than or equal to 70 GPa.

From the view point of higher abrasion resistance, preferably, the composite polycrystal of the present embodiment contains polycrystalline diamond formed of diamond grains that are directly bonded mutually, and compressed graphite dispersed in the polycrystalline diamond, wherein the polycrystalline diamond has a phase that is continuous three-dimensionally; the diamond grains forming the polycrystalline diamond have a mean grain size of greater than or equal to 10 nm and less than or equal to 1000 nm; the compressed graphite has a mean grain size of greater than or equal to 10 nm and less than or equal to 2000 nm; the compressed graphite has a percentage in the composite polycrystal in whole of greater than or equal to 0.1% and less than or equal to 40% as calculated from $100 \times Ig(002)/\{Id(111)+Ig(002)\}$ wherein $Ig(002)$ is an area of an X-ray diffraction peak derived from (002) surface of the compressed graphite, and $Id(111)$ is an area of an X-ray diffraction peak derived from (111) surface of the polycrystalline diamond in an X-ray diffraction profile of the composite polycrystal; and the composite polycrystal has a Knoop hardness of greater than or equal to 50 GPa.

(Method for Producing Composite Polycrystal)

A method for producing composite polycrystal 10 of the present embodiment is not particularly limited, but from the view point of efficiently producing composite polycrystal 10 having high abrasion resistance at a low cost, preferably, the method includes a material preparing step of preparing non-diamond carbon as a material, and a composite polycrystal forming step of forming composite polycrystal 10 by sintering the material under temperature and pressure conditions under which a diamond phase is formed.

The non-diamond carbon as a material prepared in the material preparing step may be a powder or a compact. The mean grain size of the powder, or the mean grain size of grains forming the compact is preferably greater than or equal to 10 nm, and preferably less than or equal to 5000 nm, more preferably less than or equal to 2000 nm. From the view point of forming a composite polycrystal having high quality and high purity, preferably, the non-diamond carbon as a material is graphite, although not particularly limited. The purity of the graphite is preferably greater than or equal to 99% by mass, more preferably greater than or equal to 99.5% by mass.

In the composite polycrystal forming step, the sintering conditions are not particularly limited as long as they are the temperature and pressure conditions under which a diamond phase is formed. However, from the view point of efficient formation of the diamond phase and ease of adjustment of the percentage of the phase of the compressed graphite, conditions including a temperature of greater than or equal to 1800° C. and less than or equal to 2500° C., and a pressure of greater than or equal to 8 GPa and less than or equal to 15 GPa are preferred. Within these ranges, for example, it is more preferred that the temperature is greater than or equal to 2000° C. and less than or equal to 2500° C. at 9 GPa, the temperature is greater than or equal to 1900° C. and less than or equal to 2400° C. at 12 GPa, and the temperature is greater than or equal to 1800° C. and less than or equal to 2000° C. at 16 GPa. A high temperature and high pressure generating device that generates such a high temperature and a high pressure is not particularly limited, and a belt type, cubic type or blastomere type device can be recited.

EXAMPLES

Examples 1 to 5

Composite polycrystals according to Examples 1 to 5 were prepared in the following manner. A graphite compact having a density of 1.85 g/cm³ and a purity of greater than or equal to 99.95% by mass was prepared as a starting material (material preparing step). The graphite compact was formed by baking to solidify and press-molding graphite grains having a mean grain size of 300 to 3000 nm. Then, the graphite compact prepared as described above was put into a capsule made of high-melting-point metal, and the graphite compact was converted into diamond and sintered by retaining the compact for 20 minutes at a temperature and a pressure shown in Table 1 (the column of "synthesis conditions") by using a high pressure generating device (composite polycrystal forming step). In this manner, composite polycrystals according to the examples were obtained.

Comparative Example 1

A composite polycrystal according to Comparative Example 1 was prepared in the following manner. A graphite compact having a density of 1.85 g/cm³ and a purity of greater than or equal to 99.95% by mass was prepared as a starting material (material preparing step). The graphite compact was formed by press-molding graphite grains having a mean grain size of 300 nm. Then, the graphite compact prepared as described above was put into a capsule made of high-melting-point metal, and the graphite compact was converted into diamond and sintered by retaining the compact for 20 minutes at a temperature and a pressure shown in Table 1 (the column of "synthesis conditions") by using a high pressure generating device (composite polycrystal forming step). In this manner, a composite polycrystal of the comparative example was obtained.

Comparative Examples 2 and 3

Composite polycrystals according to Comparative Examples 2 and 3 were prepared in the following manner. As a starting material, a graphite powder was finely ground to have a mean grain size of less than 10 nm with a planetary ball mill, and the grains were press-molded to prepare a graphite compact having a density of 1.80 g/cm³ and a purity of 99.5% by mass (material preparing step). Then, the graphite compact prepared as described above was put into a capsule made of high-melting-point metal, and the graphite compact was converted into diamond and sintered by retaining the compact for 20 minutes at a temperature and a pressure shown in Table 1 (the column of "synthesis conditions") by using a high pressure generating device (composite polycrystal forming step). In this manner, a composite polycrystal of each comparative example was obtained.

The existence and mean grain sizes of diamond grains of the polycrystalline diamond and non-diamond carbon (compressed graphite, graphite or amorphous carbon) in the composite polycrystal in each of Examples 1 to 5 and Comparative Examples 1 to 3 obtained in the manner as described above were determined by the following technique. By a contrast analysis by SEM observation or TEM observation of one section of the composite polycrystal, a polycrystalline diamond phase (phase of polycrystalline diamond) and a non-diamond carbon phase (phase of non-diamond carbon) in the composite polycrystal were observed. The fact that the non-diamond carbon in Examples 1 to 5 was compressed graphite, the fact that the non-diamond carbon in Comparative Example 3 was graphite, and the fact that the non-diamond carbon in Comparative Example 2 was amorphous carbon were recognized by an appearance position and a half-value width of an X-ray diffraction peak in the later-described X-ray diffraction profile. In any of the composite polycrystals of Examples 1 to 5 and Comparative Examples 1 to 3, it was confirmed that diamond grains were directly bonded mutually in the polycrystalline diamond phase in the composite polycrystal, and that the polycrystalline diamond phase was continuous three-dimensionally.

After capturing an image in such a condition that a grain boundary is distinguishable in the SEM observation or TEM observation, an image processing (binarization) was conducted, and an average of areas of diamond grains forming the polycrystalline diamond phase and non-diamond carbon forming the non-diamond carbon phase was calculated. The diameter of a circle having the same area as the determined area was calculated, and the mean grain size of the diamond grains and the mean grain size of non-diamond carbon were obtained.

evaluated in the following manner. A sample of a composite polycrystal was worked to have a diameter $\phi$ of 2 mm and a height of 2 mm, and joined to a sample holder with an active brazing material, and then the sample was worked into a conical shape having a point angle of 120°. At the tip end of the cone, a flat surface having a diameter $\phi$ of 0.3±0.005 mm which was to be a test surface was formed by skeif polishing, and thus a diamond test piece having a truncated conical shape was prepared. Then, the test piece was attached to the main shaft of the machining center to give a tool, and the test piece was slid while being pressed against an alumina ($Al_2O_3$) sintered plate (grain size: several microns, purity: 99.9%) by applying a constant load to the test piece at an air pressure of 0.3 MPa by using an air cylinder. The size of the $Al_2O_3$ sintered plate was 100 mm×100 mm×0.1 mm, and the track of the tool was set so that the test piece drew a spiral pattern. The moving speed of the tool was 5 m/min, the sliding distance was 10 km, and the sliding time was 2000 min. The expanse of the tip end diameter after the sliding test was measured, and an abrasion loss was calculated. The results are collectively shown in Table 1.

TABLE 1

| | Mean grain size of material graphite (nm) | Synthesis conditions | | Mean grain size of diamond grains of polycrystalline diamond (nm) | Diamond composite polycrystal | | | Knoop hardness (Gpa) | Result of sliding test against alumina, abrasion loss (×10$^{-4}$ mm$^3$) |
|---|---|---|---|---|---|---|---|---|---|
| | | Pressure (GPa) | Temperature (°C.) | | Non-diamond carbon | | | | |
| | | | | | Substance | Content (X-ray diffraction peak area ratio, %) | Mean grain size (nm) | | |
| Example 1 | 3000 | 11 | 2500 | 600 | Compressed graphite | 25 | 1500 | 75 | 0.8 |
| Example 2 | 1500 | 13 | 2400 | 300 | Compressed graphite | 7 | 800 | 105 | 1.0 |
| Example 3 | 400 | 13 | 2000 | 20 | Compressed graphite | 35 | 300 | 68 | 0.8 |
| Example 4 | 300 | 12 | 2300 | 200 | Compressed graphite | 0.5 | 70 | 115 | 1.5 |
| Example 5 | 300 | 11 | 2200 | 150 | Compressed graphite | 15 | 40 | 90 | 1.0 |
| Comparative Example 1 | 300 | 16 | 2300 | 150 | None | 0 | — | 132 | 6 |
| Comparative Example 2 | <10 | 10 | 1800 | <10 | Amorphous carbon | 10 | 10 | 45 | 15 |
| Comparative Example 3 | <10 | 9 | 2400 | 600 | Graphite | 2 | 600 | 40 | 20 |

An X-ray diffraction profile of a composite polycrystal in each of Examples 1 to 5 and Comparative Examples 1 to 3 was measured by a 2θ scanning method using X-ray from Kα rays of Cu as a radiation source, and the value of 100×Ig (002)/{Id (111)+Ig (002)} was calculated, wherein Ig (002) is an area of an X-ray diffraction peak derived from (002) surface of non-diamond carbon of compressed graphite 12, graphite or amorphous carbon, and Id (111) is an area of an X-ray diffraction peak derived from (111) surface of polycrystalline diamond 11.

Moreover, Knoop hardness of each composite polycrystal of Examples 1 to 5 and Comparative Examples 1 to 3 was measured with a microhardness tester using a Knoop indenter made of diamond at a load of 4.9 N.

Further, abrasion resistance of each composite polycrystal of Examples 1 to 5 and Comparative Examples 1 to 3 was Referring to Table 1, as shown in Examples 1 to 5, the composite polycrystal containing polycrystalline diamond formed by direct bonding of diamond grains and compressed graphite dispersed in the polycrystalline diamond had higher abrasion resistance.

It is to be understood that the embodiment and examples disclosed herein are not restrictive but illustrative in all respects. The scope of the present invention is indicated by claims rather than by the above description, and it is intended that every modification within the equivalent meaning and scope of claims is included in the present invention.

REFERENCE SIGNS LIST

10 Composite polycrystal, 11 Polycrystalline diamond, 12 Compressed graphite

The invention claimed is:

1. A composite polycrystal comprising: polycrystalline diamond formed of diamond grains that are directly bonded mutually, and compressed graphite dispersed in said polycrystalline diamond, wherein
said compressed graphite has an interplanar spacing in a C axis smaller than that of normal graphite, and
said compressed graphite has a percentage in said composite polycrystal in whole of greater than or equal to 0.5% and less than or equal to 35% as calculated from $100 \times Ig(002)/\{Id(111)+Ig(002)\}$ wherein $Ig(002)$ is an area of an X-ray diffraction peak derived from (002) surface of said compressed graphite, and $Id(111)$ is an area of an X-ray diffraction peak derived from (111) surface of said polycrystalline diamond in an X-ray diffraction profile of said composite polycrystal.

2. The composite polycrystal according to claim 1, wherein said polycrystalline diamond has a phase that is continuous three-dimensionally.

3. The composite polycrystal according to claim 1, wherein said diamond grains forming said polycrystalline diamond have a mean grain size of greater than or equal to 10 nm and less than or equal to 1000 nm.

4. The composite polycrystal according to claim 1, wherein said compressed graphite has a mean grain size of greater than or equal to 10 nm and less than or equal to 2000 nm.

5. The composite polycrystal according to claim 1, having a Knoop hardness of greater than or equal to 50 GPa.

6. A composite polycrystal comprising: polycrystalline diamond formed of diamond grains that are directly bonded mutually, and compressed graphite dispersed in said polycrystalline diamond, wherein
said polycrystalline diamond has a phase that is continuous three-dimensionally;
said diamond grains forming said polycrystalline diamond have a mean grain size of greater than or equal to 10 nm and less than or equal to 1000 nm;
said compressed graphite has an interplanar spacing in a C axis smaller than that of normal graphite;
said compressed graphite has a mean grain size of greater than or equal to 10 nm and less than or equal to 2000 nm;
said compressed graphite has a percentage in said composite polycrystal in whole of greater than or equal to 0.5% and less than or equal to 35% as calculated from $100 \times Ig(002)/\{Id(111)+Ig(002)\}$ wherein $Ig(002)$ is an area of an X-ray diffraction peak derived from (002) surface of said compressed graphite, and $Id(111)$ is an area of an X-ray diffraction peak derived from (111) surface of said polycrystalline diamond in an X-ray diffraction profile of said composite polycrystal; and
the composite polycrystal has a Knoop hardness of greater than or equal to 50 GPa.

* * * * *